Nov. 6, 1962 E. H. HARTEL 3,062,485
AIRCRAFT LANDING GEAR FOR USE ON CATAPULT AIRCRAFT
Filed June 6, 1960 4 Sheets-Sheet 1

INVENTOR.
ERWIN H. HARTEL
BY
*ATTORNEY*

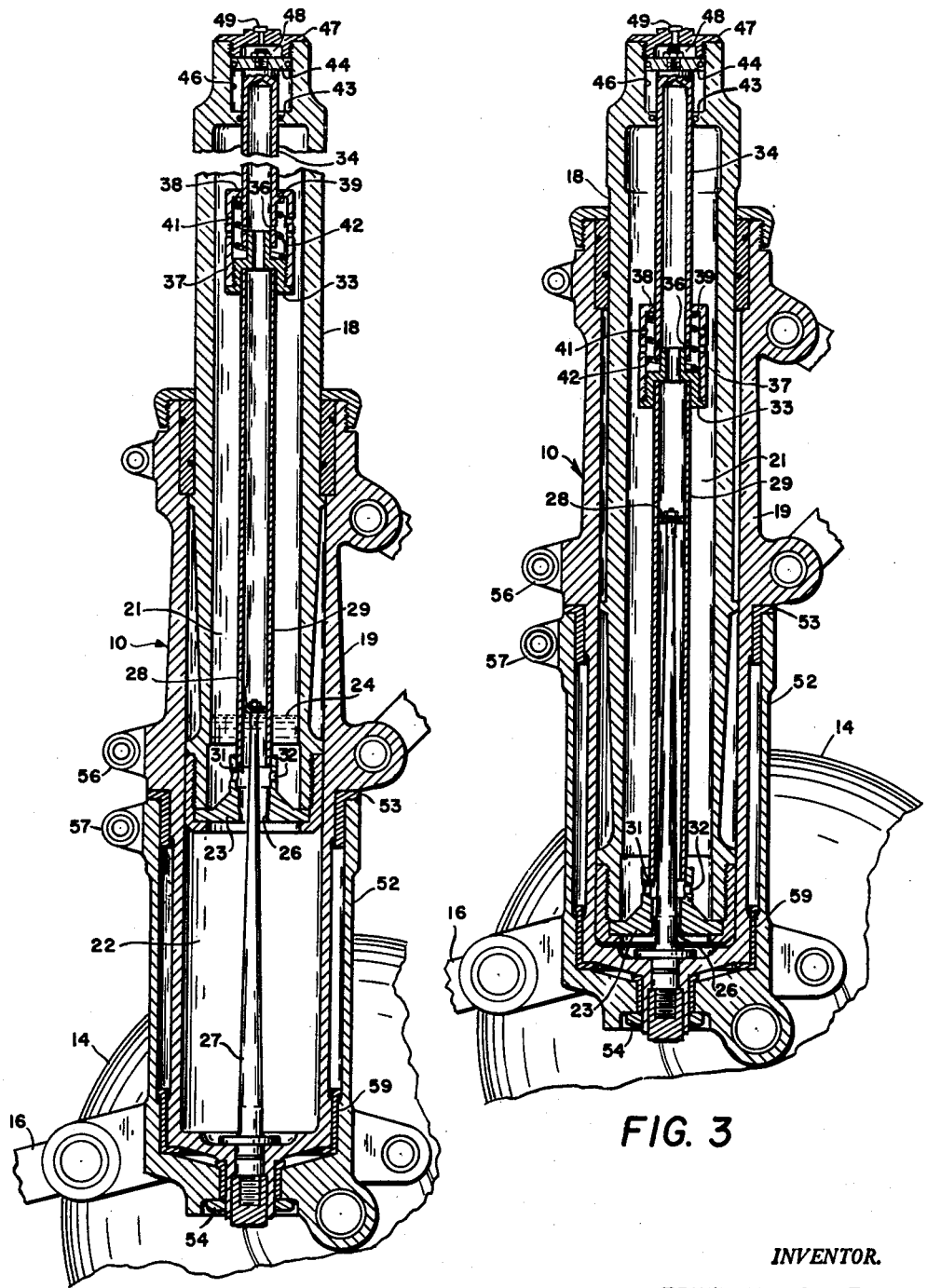

Nov. 6, 1962 E. H. HARTEL 3,062,485
AIRCRAFT LANDING GEAR FOR USE ON CATAPULT AIRCRAFT
Filed June 6, 1960 4 Sheets-Sheet 3

INVENTOR.
ERWIN H. HARTEL
BY
ATTORNEY

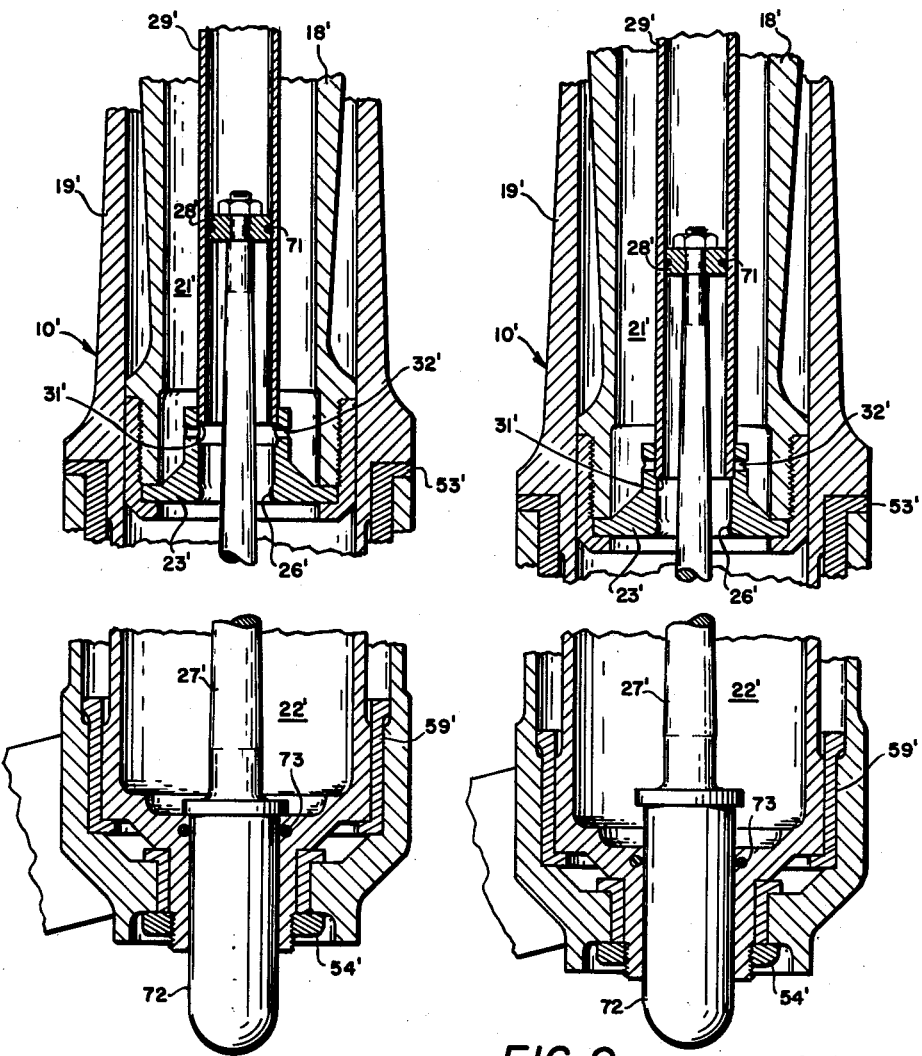

United States Patent Office 3,062,485
Patented Nov. 6, 1962

1

3,062,485
AIRCRAFT LANDING GEAR FOR USE ON
CATAPULT AIRCRAFT
Erwin H. Hartel, Cleveland, Ohio, assignor to Cleveland
Pneumatic Industries, Inc., Cleveland, Ohio, a corporation of Ohio
Filed June 6, 1960, Ser. No. 34,105
7 Claims. (Cl. 244—63)

This invention relates generally to landing gears but more particularly to a landing gear for use on catapult aircraft which can be locked in the extended position.

In the past it has been customary to use slings or yokes connected between the fuselage of the aircraft and the catapult shuttle. Such yokes or slings do not provide adequate guidance of the aircraft during the catapult run and are unnecessarily clumsy. A landing gear, according to this invention, is particularly suited for use in aircraft wherein the catapult is connected to the nose landing gear. To eliminate pitching or porposing of the aircraft during the catapult run, the landing gear is arranged to be locked against compression or extension during the catapult run. In the particular embodiment shown, the landing gear is designed to maintain the fully extended position under static load conditions, and is provided with means to prevent the compression of the strut under the loads which occur during rapid acceleration of the catapult run.

It is an important object of this invention to provide an aircraft landing gear shock strut which can be locked against telescoping movement.

It is another important object of this invention to provide an aircraft landing gear having means which can be operated to hydraulically lock the landing gear in a predetermined position.

It is still another important object of this invention to provide an aircraft landing gear suitable for use on catapults which is substantially locked in the extended position during the catapult operation.

It is still another important object of this invention to provide an aircraft landing gear having normal spring rate for landing operation and which has a substantially high spring rate for catapult launching operations.

It is still another important object of this invention to provide an aircraft landing gear incorporating means to limit the load applied to the landing wheel during catapult runs.

It is still another important object of this invention to provide an aircraft landing gear wherein compressed gas is used in combination with hydraulic damping during the landing operation and wherein the compressibility of the hydraulic damping liquid provides the spring effect during take-off operation.

Further objects and advantages will appear from the following description and drawings wherein:

FIGURE 2 is a longitudinal section of the shock strut structure showing the elements in the extended position;

FIGURE 3 is a view similar to FIGURE 2 illustrating the positions the elements assume when the landing gear strut is compressed;

FIGURE 8 is an enlarged fragmentary view of a second embodiment of this invention illustrating the valving in the open position for normal landing operation; and, FIGURE 9 is a view similar to FIGURE 8 showing the landing gear with the valves closed.

Figures 1, 4, 5:
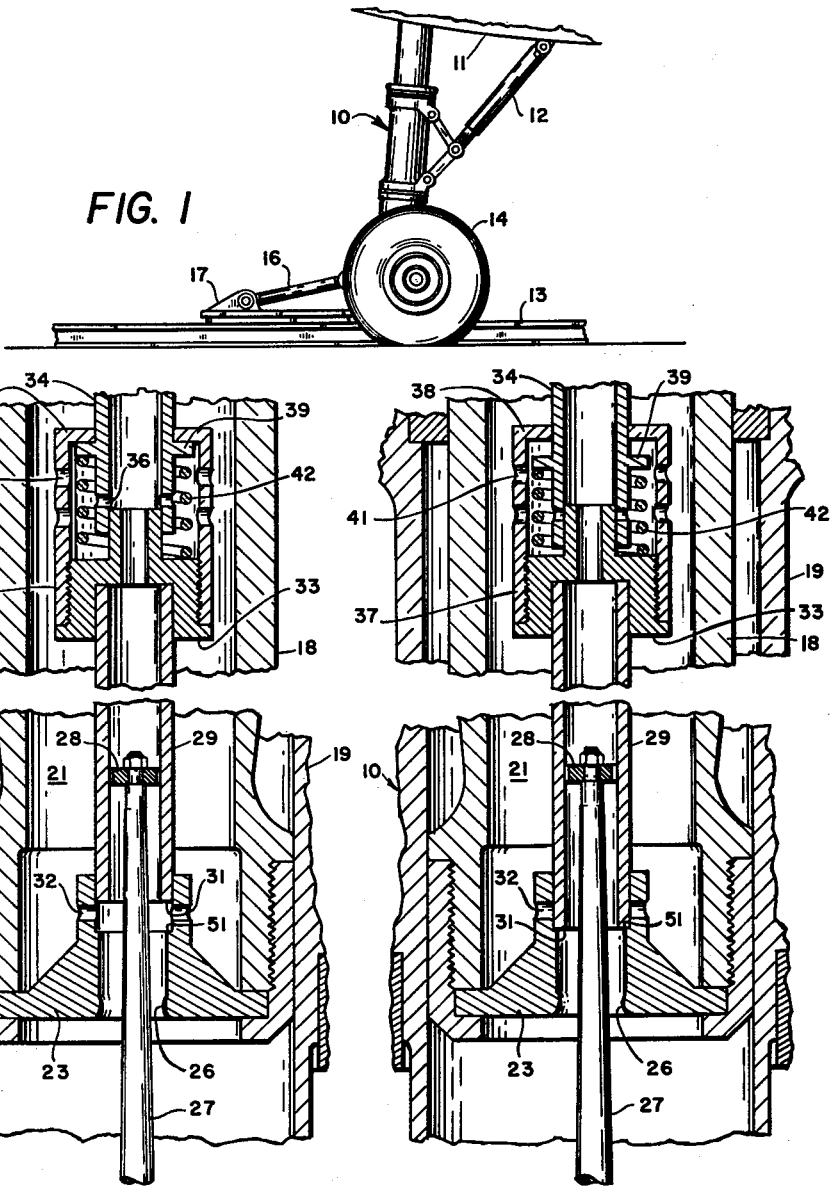
FIGURE 1 is a fragmentary side elevation of a nose landing gear incorporating this invention illustrating a preferred connection between the landing gear and the launching catapult.
FIGURE 4 is a fragmentary enlarged view of the valved means showing the positions of the elements when the gear is unlocked.
FIGURE 5 is a fragmentary view illustrating the valving mechanism in the closing position in which the landing gear is locked.

In a normal aircraft landing gear a piston member telescopes into a cylinder member and cooperates therewith to define a fluid-tight cavity which is divided into two chambers by an orifice plate carried by the upper member. The lower chamber is filled with oil which is forced through the orifice during the compression of the landing gear and the upper chamber contains compressed air to provide the springing of the gear. In a landing gear according to this invention, the piston is in the fully extended position when the landing gear is supporting the static weight of the aircraft and valved means are provided to isolate the gas used for normal springing so that the landing gear is substantially hydraulically locked in the fully extended position for catapult operation.

In the first embodiment, illustrated in FIGURES 1 through 5, a small volume of gas remains in communication with the lower or oil chamber so that a very stiff spring is provided. This provides a limited amount of springing while preventing porpoising during the catapult run of the aircraft. In the second embodiment, illustrated in FIGURES 6 through 9, all of the gas is completely isolated from the lower oil-filled chamber and the compressibility of the liquid is utilized to prevent overloading of the landing wheel.

Because of the extreme acceleration required for catapult operation, there is a tendency for the aircraft to porpoise during the catapult run. Porpoising, which is the vertical oscillation of the aircraft tends to occur when the line of action of the catapult force does not pass through the center of gravity of the aircraft. In the past a long sling has been used which connects the catapult shuttle to the fuselage of the aircraft. Because the sling was long the angle of the catapult force did not change very much even when there was some pitching movement of the aircraft. These long slings, however, are difficult to use and do not adequately guide the aircraft. In the illustrated embodiment of this invention the catapult shuttle is connected by a short bar to the nose landing gear of the aircraft. This type of connection is easier to use and provides very good directional guidance of the aircraft. However, because the connecting bar is short any pitching of the aircraft causes a relatively large angular change in the direction of the line of the catapult force. Because of these larger angular changes the line of action of the catapult force does not necessarily pass through, or close to, the center of gravity of the aircraft and porpoising would occur if means were not provided to prevent it. By providing a substantially rigid nose landing gear through which the catapult force is transmitted to the aircraft it is possible to eliminate porpoising during the catapult run.

The draw bar which connects the shuttle and nose landing gear is inclined up from the shuttle to the landing gear. Therefore a vertical component of force is applied to the landing gear which tends to overload the landing wheel unless sufficient reserve capacity is provided in the tires. In the first embodiment disclosed the tires must be sized to support this vertical load. In the second embodiment the landing gear is locked against compression and in addition means are provided to absorb the vertical catapult loads.

FIGURE 1 discloses a landing gear incorporating this invention having a shock strut 10 mounted on the frame of the aircraft schematically shown at 11. A drag brace 12 is connected between the shock strut 10 and the aircraft frame 11 to securely position the shock strut in the down and locked position shown. The drag brace is normally adapted to fold upon retraction of the landing gear but since this structure forms no part of the instant invention the structural details have not been illustrated.

The catapult is schematically illustrated at 13 and utilizes a rail which is positioned between the dual wheels 14 of the landing gear. A draw bar 16 connects between the shock strut 10 and the shuttle 17 of the catapult.

Referring to FIGURES 2 and 3 the shock strut 10 includes a piston member 18 mounted on the aircraft frame and a telescoping cylinder member 19. The piston 18 and the cylinder 19 cooperate to define a fluid cavity divided into an upper and lower chamber 21 and 22 respectively by an orifice plate 23 mounted on the lower end of the piston 18. When the shock strut 10 is in the fully extended position of FIGURE 2, liquid fills the lower chamber 22 and the lower part of the upper chamber 21 to the level illustrated at 24. The remaining portion of the upper chamber 21 is filled with compressed gas so that the liquid is pressurized and the cylinder 19 is resiliently urged downwardly relative to the piston 18. Fluid communication is provided between the upper and lower chambers through a central orifice 26 formed in the orifice plate 23. The usual contoured metering pin 27 is mounted in the lower end of the cylinder 19 and extends through the orifice 24. A guide 28 is mounted on the upper end of the metering pin 27 and is slidable along the inner wall of a valve tube 29.

During normal operations when the landing gear is not locked the lower end 31 of the valve tube 29 is spaced above a plurality of radial ports 32 formed in the orifice plate 23; therefore, fluid communication is provided between the lower chamber 22 and the upper chamber 21 through the orifice 26 around the metering pin 27 and through the radial port 32.

The guide 28 is provided with axial slots so that fluid can pass the guide 28 thus connecting the valve tube on both sides of the guide 28. The upper portion of the valve tube 29 is mounted in a valve member 33 which projects into a tubular piston 34. The upper end of the valve member 33 is normally spaced below radial ports 36 formed in the wall of the piston 34, so the radial ports 36 are normally open.

Mounted on the valve member is a cup-shaped retainer 37 formed with an upper radial shoulder 38 which engages a stop ring 39 on the piston 34 to prevent downward movement of the valve tube 29 relative to the piston 39 beyond the position shown. The retainer 37 is provided with radial ports 41 so that communication is provided between the inside of the valve tube 29 and the upper chamber 21 through the valve tube and the radial ports 36 and 41. A spring 42 extends between the stop 39 and the valve member 33 and resiliently maintains the element in the position shown with the shoulder 38 engaging the stop 39.

The piston 34 extends through a seal 43 mounted in the upper end of the piston 18 and is provided with a piston head 44 which engages the wall of a cylinder bore 46 in the piston 18. The upper end of the cylinder bore 46 is closed by a fluid tight cap 47 which cooperates with the piston head 44 and bore 46 to define an actuation chamber 48. Actuating fluid under pressure can be admitted into the actuation chamber 48 through a port 49 connected to a suitable source of pressure on the aircraft. When the actuation chamber 48 is pressurized the piston 34 is moved down until the lower end 31 of the valve tube 29 engages a shoulder 51. This shoulder 51, which is formed on the orifice plate 23, limits the downward movement of the valve tube after it has closed the radial ports 32 so continued downward movement of the piston 34 results in compression of the spring 42 and closing of the radial ports 36. At this time the lower chamber 22 is completely isolated from the upper chamber 21 around the valve tube 29 as shown in FIGURE 5. When pressure is released from actuation chamber 48 the pressure of the gas within the upper chamber 21 acts on the piston 34 to return it to the upper position shown in FIGURE 2. Because the gas within the upper chamber 21 acts on the piston 34 it is not necessary to provide double action for the valve operating actuator.

Under normal static loads the shock strut is in the condition shown in FIGURE 2 with the radial ports 32 and 36 open. Therefore, communication is provided between the lower chamber 22 and the upper chamber 21. During the impact of the landing the cylinder 19 moves up along the piston 18 reducing the volume of the lower chamber 22. This causes oil to be displaced from the lower chamber 22 to the upper chamber 21 increasing pressure of the gas contained therein.

In FIGURE 3 the elements are shown in the fully compressed position. After the initial impact of the landing occurs the gas within the upper chamber 21 causes the cylinder 19 to extend to the fully extended position of FIGURE 2. The various elements are proportioned so that the landing gear will be maintained with a fully extended position when it is supporting the static weight of the aircraft on the ground.

Because steering should be provided on the nose landing gear of an aircraft the landing wheels 14 are carried by a tubular wheel support member 52 journalled on the lower end of the cylinder 19 for rotation around the central axis of the strut. The wheel support member 52 is fixed against axial movement relative to the piston by a bearing shoulder 53 and a lower bearing ring 54. Thus the wheel support member 52 and the landing wheels 14 which are journalled thereon to rotate relative to the cylinder 19 and are fixed against axial movement relative thereto. A hydraulic steering motor would normally be connected between a first boss 56 formed in the piston 19 and a second boss 57 formed on the wheel support member 52. The drag brace 12 is connected to the cylinder 19 and prevents rotation of the cylinder 19 as well as laterally supporting the strut so the usual torque arms are not necessary. The use of a relatively long wheel support member 52 journalled on the piston 19 permits the substantial spacing of the bearings so that the extreme lateral catapult forces can adequately be absorbed.

When the landing gear is to be substanttially locked in the extending position the actuation chamber 48 is pressurized causing the radial ports 32 and 36 to be closed. This isolates the small volume of compressed gas within the valve tube 29 from the remaining compressed gas in the upper chamber around the valve tube 29. This amount of gas provides a small amount of springing so that the strut is not rigid. However, since the volume of gas in communication with the lower chamber 22 is very small and since the liquid is substantially incompressible the shock strut is substantially locked in its extended position. The tendency for the aircraft to porpoise during the launching operation is, therefore, eliminated.

In the second embodiment, illustrated in FIGURES 6 through 9, similar reference numerals are used to indicate parts which correspond to similar parts of the first embodiment but a prime (') is added to indicate that reference is made to the second embodiment.

Here again the cylinder 19' and the piston 18' cooperate to form an upper chamber 21' and a lower chamber 22'. The lower chamber is again filled with liquid as is the lower portion of the upper chamber 21'. In this embodiment, however, the guide 28' is provided with a seal 71 which engages the inner wall of the valve tube 29'. Therefore, the fluid communication is not provided with the upper portion of the valve tube 29' past the guide 28'. For this reason it is not necessary to use the valve assembly connecting the piston 34 with the valve tube 29 of the first embodiment. However, it is necessary to provide radial ports in the valve tube 29' in the zone above the guide 28'. The valve tube 29', however, functions in a manner similar to the valve tube of the first embodiment to permit flow of the liquid through the radial ports 32', or to prevent such flow when the valve tube 29' is moved downward by the valve actuator. FIGURE 8 discloses the valve tube in the upper or open position and FIGURE 9 shows the closed position.

Figure 6:
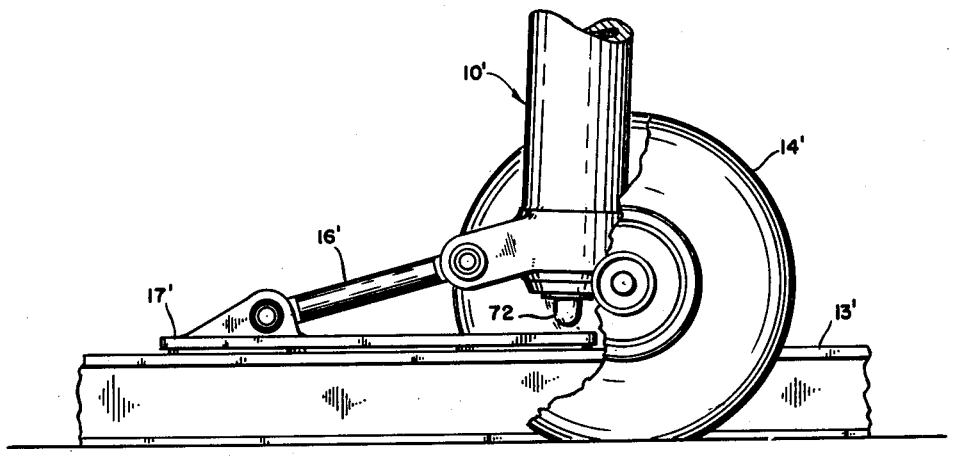
FIGURE 6 is a fragmentary view of a second embodiment of this invention wherein the compressibility of the liquid is used to prevent overloading of the landing wheel illustrating the position of the elements when the landing gear is supporting the static weight of the aircraft.
Figure 7:
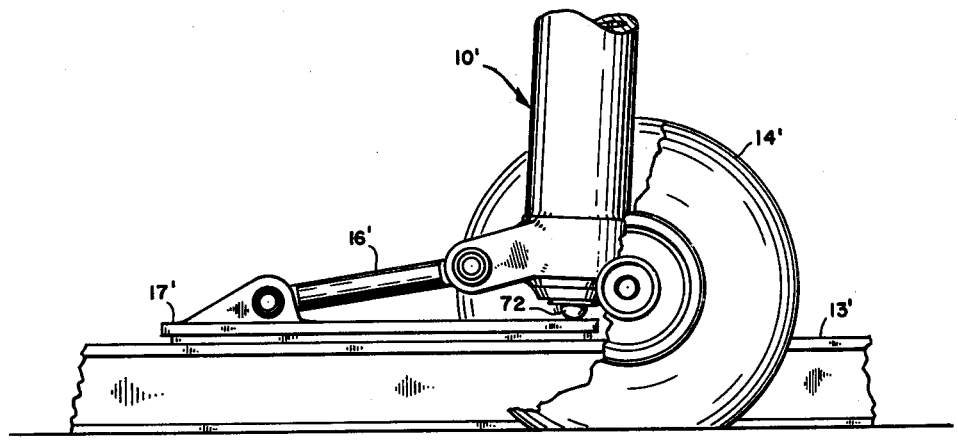
FIGURE 7 is a similar view of FIGURE 6 illustrating the positions of the landing gear during the catapult run at which time the tires are compressed and the landing gear is partially supported on the catapult shuttle.

The metering pin 27 is formed with a plunger 72 which extends through a seal 73 mounted in the lower end of the piston 19'. This plunger 72 projects below the lower end of the strut as illustrated in FIGURE 6 and is adapted to clear the shuttle 17' when the landing gear is supporting the static weight of the aircraft as illustrated in FIGURE 6. During the launching operation, however, the accelerating forces transmitted through the draw bar 16' have a vertical component which increases the load on the landing wheel 14' compressing the tires until the plunger 72 engages the shuttle 17' as illustrated in FIGURE 7. This causes the plunger 72 to move upwardly relative to the piston 19' as illustrated in FIGURES 7 and 9. Since the lower chamber 22' is completely isolated from gas in the upper chamber 21' when the valve tube 29' is in its closed position upward motion of the plunger 72, reduces the volume in the lower chamber 22' by an amount equal to the difference in area between the plunger 72 and the guide 28' times the stroke of the plunger 72. This results in a compression of the liquid within the lower chamber 22'. Because liquid is relatively incompressible a very small amount of compression of the liquid within the lower chamber 22' causes very rapid increase in the pressure. Therefore a high rate short stroke liquid spring is provided. The strut is locked against compression at this time because the effective area of the piston 18' is large when compared to the difference in area between the plunger 72 and the guide 28'. The use of a combination strut of this type wherein normal landing impacts are absorbed by compressing gas in the upper chamber 21' and the tire overloading during launching is prevented by a liquid spring results in a combination of elements which operate in a very efficient manner.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of this invention.

I claim:
1. An aircraft landing gear comprising upper and lower telescoping members cooperating to define a fluid-tight cavity, valved flow control means on said upper member dividing said cavity into upper and lower chambers, liquid filling said lower chamber and a portion of said upper chamber, compressed gas filling the remaining portion of said upper chamber, said valved means normally providing fluid communication between said chambers and being operable to isolate substantial portions of said compressed gas from said lower chamber, and externally controllable actuating means connected to operate said valved means.

2. An aircraft landing gear comprising upper and lower telescoping members cooperating to define a fluid-tight cavity, an orifice plate carried by said upper member dividing said cavity into upper and lower chambers, liquid filling said lower chamber, gas under pressure in said upper chamber pressurizing said liquid, a divider in said upper chamber separating the main portion thereof from a zone having a volume substantially less than said main portion, valved means normally connecting said lower chamber with said main portion and said zone and operable upon actuation to isolate only said main portion from said lower chamber and said zone and means selectively cooperable with said valved means to effect said actuation.

3. An aircraft landing gear comprising upper and lower telescoping members cooperating to define a fluid-tight cavity, an orifice plate carried by said upper member dividing said cavity into upper and lower chambers, liquid filling said lower chamber, gas under pressure in said upper chamber pressurizing said liquid, a tube in said upper chamber, valved means normally connecting said lower chamber with said upper chamber outside said tube and the interior of said tube and upon actuation being operable to isolate the upper chamber outside of said tube from said lower chamber and the interior of said tube and means selectively cooperable with said valved means to effect said actuation.

4. An aircraft landing gear comprising upper and lower telescoping members cooperating to define a fluid-tight cavity, an orifice plate carried by said upper member dividing said cavity into upper and lower chambers, liquid filling said lower chamber and a portion of said upper chamber, gas under pressure filling the remainder of said upper chamber, an open ended tube in said upper chamber, valved means normally connecting said lower chamber with said upper chamber and both ends of said tube with said upper chamber, said valve means upon actuation being operable to isolate the upper chamber around said tube from said lower chamber and the interior of said tube and an externally actuated pressure responsive piston means selectively cooperable with said valved means to effect said actuation.

5. An aircraft landing gear shock absorber comprising upper and lower telescoping members cooperating to define a fluid-tight cavity, valved flow control means on said upper member dividing said cavity into upper and lower chambers, liquid filling said lower chamber and a portion of said upper chamber, compressed gas filling the remaining portion of said upper chamber, said valved means normally providing fluid communication between said chambers and being operable to isolate said upper chambers from said lower chamber, and a plunger in said lower member moveable under the influence of loads applied thereto operable to compress the liquid in said lower chamber when said valved means isolates said chambers.

6. An aircraft landing gear shock absorber comprising a pair of telescoping members axially moveable relative to each other between an extended and a compressed position, said members cooperating to form a fluid pressure cavity, an orifice carried by one of said members dividing said cavity into upper and lower chambers, the volume of said lower chamber being reduced by telescoping movement between said members toward said compressed position, liquid filling said lower chamber and a portion of said upper chamber, gas under pressure filling the remainder of said upper chamber, valved means normally providing fluid communication between said chambers operating to a closed condition to isolate said chambers, and separate plunger means on the other of said members operable to reduce the volume of said lower chamber and compress the liquid contained therein when said valved means is closed, telescoping movement of said members toward said compressed position normally displacing liquid from said lower chamber into said upper chamber, operation of said valved means isolating said chambers restricting telescoping movement between said members.

7. In combination a catapult shuttle, an aircraft landing gear connected to said shuttle, said landing gear including upper and lower telescoping members cooperating to define a fluid-tight cavity, valved flow control means on said upper member dividing said cavity into upper and lower chambers, liquid filling said lower chamber and a portion of said upper chamber, compressed gas filling the remaining portion of said upper chamber, said chamber means normally providing fluid communication between said chambers and being operable to isolate said upper chamber from said lower chamber, a plunger in said lower member movable under the the influence of engagement with said shuttle operable to compress the liquid in said lower chamber when said valved means isolates said chambers, and landing wheels on said lower member normally maintaining said plunger spaced from said shuttle being compressible under loads on said landing gear to permit engagement between said shuttle and plunger.

References Cited in the file of this patent
UNITED STATES PATENTS

| | | |
|---|---|---|
| 2,492,765 | Porath | Dec. 27, 1949 |
| 2,735,674 | Smith et al. | Feb. 21, 1956 |
| 2,767,978 | Keefer | Oct. 23, 1956 |
| 2,862,682 | Davies | Dec. 2, 1958 |
| 2,942,805 | Zimnoch | June 28, 1960 |